(12) United States Patent
Kikuchi et al.

(10) Patent No.: US 8,398,163 B2
(45) Date of Patent: Mar. 19, 2013

(54) ROOF APPARATUS

(75) Inventors: Mitsutoshi Kikuchi, Kariya (JP);
Kazuki Sawada, Handa (JP)

(73) Assignee: Aisin Seiki Kabushiki Kaisha,
Kariya-shi, Aichi-ken (JP)

( * ) Notice: Subject to any disclaimer, the term of this patent is extended or adjusted under 35 U.S.C. 154(b) by 0 days.

(21) Appl. No.: 13/137,116

(22) Filed: Jul. 21, 2011

(65) Prior Publication Data

US 2012/0112498 A1    May 10, 2012

(30) Foreign Application Priority Data

Nov. 5, 2010    (JP) .................................. 2010-248696

(51) Int. Cl.
  *B60J 7/043*  (2006.01)
  *B60J 7/047*  (2006.01)
(52) U.S. Cl. .................................. 296/223; 296/216.03
(58) Field of Classification Search ...... 296/216.01–224
   See application file for complete search history.

(56) References Cited

U.S. PATENT DOCUMENTS

| | | | |
|---|---|---|---|
| 4,830,428 A * | 5/1989 | Masuda et al. | ................ 296/219 |
| 7,178,862 B2 | 2/2007 | Oechel | |
| 7,578,550 B2 | 8/2009 | Sawada | |
| 7,828,376 B2 | 11/2010 | Nellen | |

FOREIGN PATENT DOCUMENTS

| | | |
|---|---|---|
| EP | 2 078 630 | 3/2011 |
| JP | 2005-162063 | 6/2005 |

* cited by examiner

*Primary Examiner* — Dennis Pedder
(74) *Attorney, Agent, or Firm* — Finnegan, Henderson, Farabow, Garrett & Dunner, LLP

(57) ABSTRACT

A roof apparatus includes a guide rail extending in a front-rear direction of a vehicle, a drive shoe, a functional bracket, a front link member relatively rotatably connected at a front portion of the functional bracket and including a connecting portion, an engagement portion and a supporting portion, and a lifting mechanism connected at a rear portion of the functional bracket, wherein the guide rail includes a first guide portion guiding the supporting portion in response to an opening and closing operation of a movable panel and being closely located upwardly and downwardly of the supporting portion while the movable panel is in a fully-closed state, and the drive shoe includes a second guide portion guiding the engagement portion in response to the opening and closing operation of the movable panel and being closely located upwardly and downwardly of the engagement portion during the fully-closed state of the movable panel.

6 Claims, 9 Drawing Sheets

ROOF APPARATUS

CROSS REFERENCE TO RELATED APPLICATIONS

This application is based on and claims priority under 35 U.S.C. §119 to Japanese Patent Application 2010-248696, filed on Nov. 5, 2010, the entire content of which is incorporated herein by reference.

TECHNICAL FIELD

This disclosure generally relates to a roof apparatus. More specifically, this disclosure pertains to the roof apparatus, which is configured so as to open and close a movable panel provided at an opening portion of a roof panel of a vehicle and which includes a tilt-up mode and a slide-mode as opening and closing operation modes.

BACKGROUND DISCUSSION

Disclosed in JP2005-162063A is an example of a known roof apparatus. Generally, the roof apparatus including the sun roof apparatus disclosed in JP2005-162063A includes a guide rail, which is fixed on a roof panel of a vehicle and extends in a front-rear direction of the vehicle, and a drive shoe, which is provided on the guide rail while allowing the drive shoe to be movable on the guide rail in the front-rear direction. In a case where the drive shoe is moved in the front-rear direction via a belt, which is driven by a motor, a movable panel is operated to open and close an opening of the roof panel via a link mechanism.

According to the sun roof apparatus disclosed in JP2005-162063A, a guide block is provided at a front portion of a guide rail. A movable panel is supported by a functional bracket, which extends in a front-rear direction of a vehicle. A guide pin is provided at a front end portion of the functional bracket so as to protrude therefrom in a vehicle width direction. The guide pin is inserted into a guide groove, which is formed on the guide block. The guide groove is formed so that a front end portion thereof extends in the front-rear direction, an intermediate portion thereof inclines in a diagonally upward direction towards a rear of the vehicle and a rear end portion thereof extends in the front-rear direction. In a case where the sun roof apparatus is in a fully-closed state and in a case where the sun roof apparatus is in a tilt-up mode, the guide pin is located at the front end portion of the guide groove. Accordingly, the functional block is rotatably supported at the front end portion of the guide groove while not being allowed to be displaced in an up-and-down direction.

Furthermore, the sun roof apparatus disclosed in JP2005-162063A is provided with a front check block, which is configured so as to rearwardly displace (i.e. slide) the functional bracket together with a front shoe as a unit in a case where a displacement of the front shoe (i.e. a drive shoe) in a rearward direction becomes equal to or more than a predetermined amount (i.e. a predetermined displacement). The front check block includes a guide pin, which is configured so that a rotational axis thereof corresponds to a rotational axis of the guide pin of the functional bracket, at a front end portion of the front check block, so that the front check block is allowed to be rotatable about the guide pin.

Until the displacement of the front shoe in the rearward direction becomes equal to or greater than the predetermined amount, the front check block remains in a state where the front check block is pressed down by an engagement pin of the front shoe. Therefore, in this case, a displacement of the front check block in an upward direction is restricted. Accordingly, the functional bracket is allowed to be rotatable only about the guide pin provided thereat (i.e. a tilt-up mode).

On the other hand, in a case where the displacement of the front shoe in the rearward direction becomes equal to or greater than the predetermined amount, the restriction on the front check block by means of the engagement pin is released and the engagement pin engages with an engagement groove of the front check block, so that the front check block and the front shoe are connected as a unit. Accordingly, the functional bracket is allowed to be movable in the rearward direction in response to the displacement of the front shoe in the rearward direction (i.e. a slide mode).

However, a configuration of the sun roof apparatus disclosed in JP2005-162063A is complicated. Furthermore, while the movable panel is in the fully-closed state, the functional bracket is restricted so as not to be displaced in the up-and-down direction (i.e. in a vertical direction) by the guide pin provided at the front end portion of the functional bracket and the engagement pin of the front shoe connected to the functional bracket (i.e. at two points). However, in this case, because slight clearances are formed between the guide groove and the guide pin, and between the engagement pin and the front check block, and because a distance between the guide pin and the engagement pin is relatively short, a backlash of the entire functional bracket in the vertical direction may not be sufficiently controlled.

A need thus exists for a roof apparatus which is not susceptible to the drawback mentioned above.

SUMMARY

According to an aspect of this disclosure, a roof apparatus, which is configured so as to open and close a movable panel provided at an opening portion of a roof panel of a vehicle and which includes a tilt-up mode and a slide mode as opening and closing operation modes, the roof apparatus includes a guide rail fixed at the roof panel and extending in a front-rear direction of the vehicle, a drive shoe driven so as to move along the guide rail in the front-rear direction of the vehicle, a functional bracket supporting the movable panel, a front link member connected at a front portion of the functional bracket so as to be rotatable relative to the functional bracket and including a connecting portion rotatably connected at the front portion of the functional bracket, an engagement portion, which is located rearwardly of the connecting portion in the front-rear direction of the vehicle and is engaged with the drive shoe so as to be rotatable relative to the drive shoe, and a supporting portion, which is located forwardly of the engagement portion and is supported by the guide rail so as to be rotatable relative to the guide rail, and a lifting mechanism connected at a rear portion of the functional bracket and configured so as to lift the rear portion of the functional bracket in response to a movement of the drive shoe, wherein the guide rail is provided with a first guide portion, which is configured so as to guide the supporting portion to be displaced in response to an opening and closing operation of the movable panel and is closely located upwardly and downwardly of the supporting portion of the front link member in a vertical direction while the movable panel is in a fully-closed state, and the drive shoe is provided with a second guide portion, which is configured so as to guide the engagement portion to be displaced in response to the opening and closing operation of the movable panel and is closely located upwardly and downwardly of the engagement portion of the front link member in the vertical direction while the movable panel is in the fully-closed state.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

First Embodiment

An embodiment of a roof apparatus, which is adapted as a sun roof apparatus 10 mounted on a vehicle, will be described below with reference to FIGS. 1 to 12.

In this disclosure, a front-rear direction of the vehicle is also referred to simply as a "front-rear direction". An upper direction (up) in a vertical direction is also referred to simply as "up (upward)". A downward direction (down) in the vertical direction is also referred to simply as "down (downward)". Additionally, a side (an aspect) positioned closer to a center of the sun roof apparatus 10 in a vehicle width direction is also referred to as "inward (in)". On the other hand, a side (an aspect) positioned so as to be distanced away from the center of the sun roof apparatus 10 in the vehicle direction is also referred to as "outward (out)".

Figure 1A:
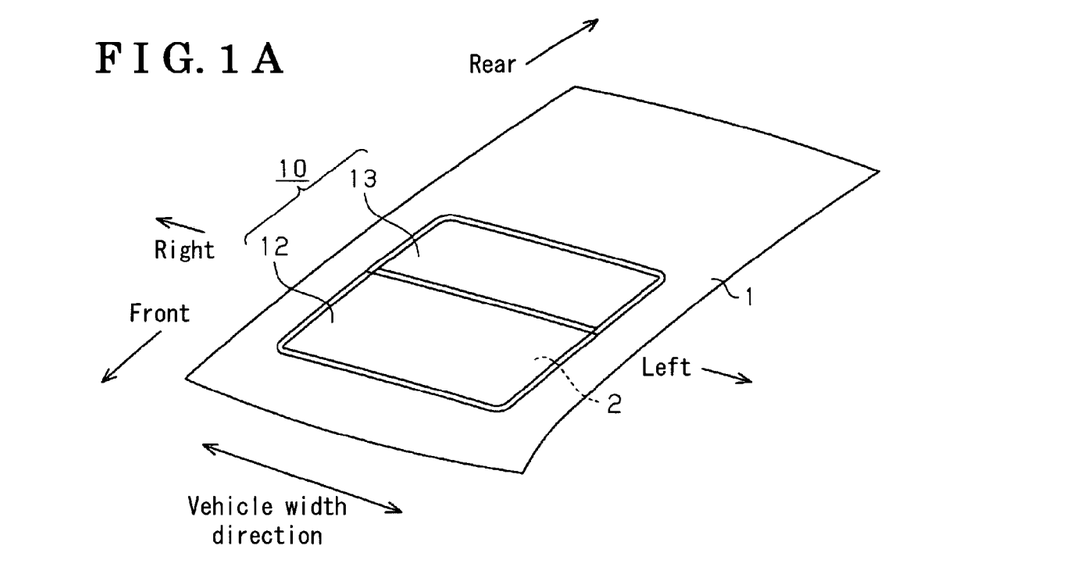
FIG. 1A is a perspective view schematically illustrating a configuration example of a vehicle roof, which is adapted as a sun roof apparatus and at which a roof apparatus according to an embodiment is adapted, while being in a closed state.

Illustrated in FIG. 1A is a schematic perspective view of a vehicle roof, on which the sun roof apparatus 10 is mounted, while the sun roof apparatus 10 is in a closed state. On the other hand, illustrated in FIG. 1B is a schematic perspective view of the vehicle roof, on which the sun roof apparatus 10 is mounted, while the sun roof apparatus 10 is in a fully-opened state.

Figure 1B:
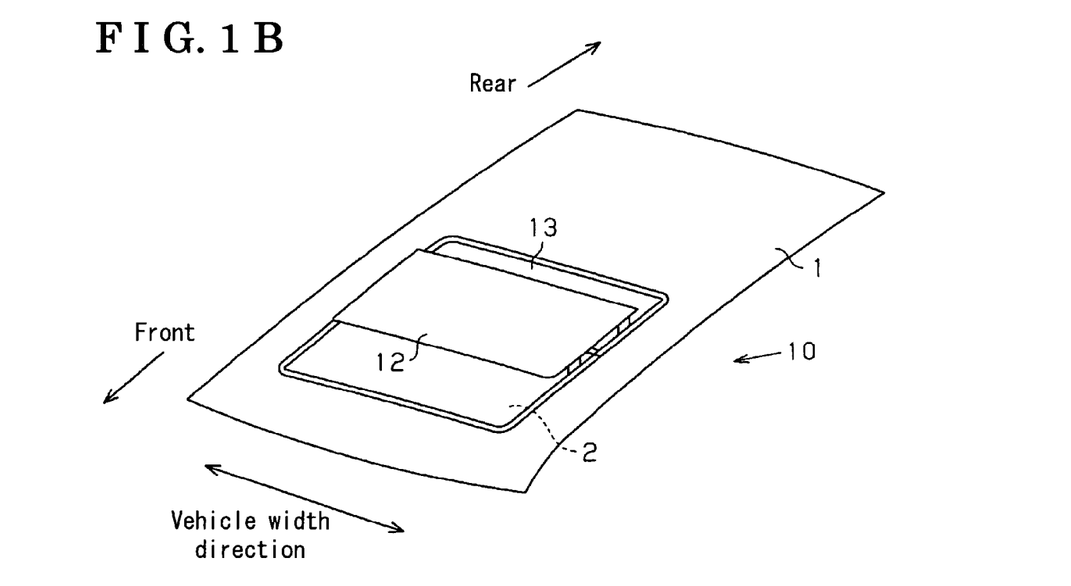
FIG. 1B is a perspective view schematically illustrating a configuration example of the sun roof apparatus according to the embodiment while being in a fully-opened state.

As illustrated in FIGS. 1A and 1B, an opening portion 2 is formed on a roof panel 1 defining the vehicle roof. A movable panel 12 and a fixing panel 13 are provided at the opening portion 2 in the above-mentioned order in the front-rear direction so that the movable panel 12 is arranged in front of the fixing panel 13 (so that the movable panel 12 is arranged at a position closer to a front portion of the vehicle relative to the fixing panel 13). Each of the movable panel 12 and the fixing panel 13 is made of, for example, a light transmissive glass. The movable panel 12 and the fixing panel 13 close the opening portion 2 from above while the sun roof apparatus 10 is in the closed state.

The movable panel 12 is provided at the opening portion 2 of the roof panel 1 while allowing the movable panel 12 to be tilted up and slidable in the front-rear direction. According to the sun roof apparatus 10 in this embodiment, a so-called outer slide system, where the movable panel 12 is slid while being tilted up, is adapted.

The fixing panel 13 is fixed on the roof panel 1 in order to maintain a state where a portion of the opening portion 2 corresponding to the arrangement position of the fixing panel 13 is closed. A mechanism for opening and closing the movable panel 12 will be described below with reference to FIGS. 2 to 12.

Figure 2:
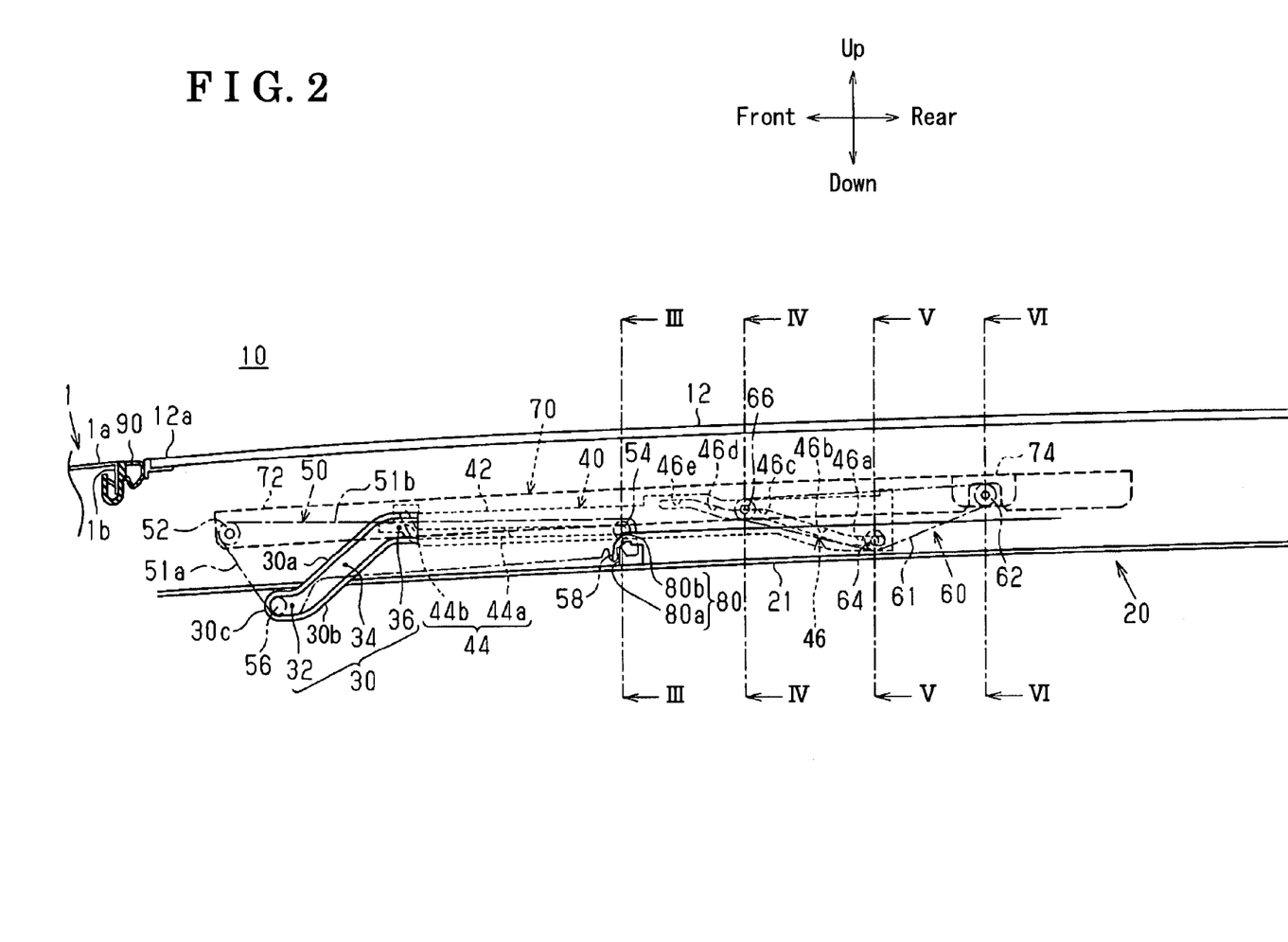
FIG. 2 is a cross-sectional diagram illustrating the configuration of the sun roof apparatus centering on a movable panel while being in a fully-closed state when being viewed in a vehicle width direction.

Illustrated in FIG. 2 is a cross-sectional diagram of a configuration of the sun roof apparatus 10 centering on the fixing panel 13 while being in the fully-closed state when being viewed in the vehicle width direction. In FIG. 2, different types of lines are used for different components in order to facilitate an explanation.

Additionally, because the sun roof apparatus 10 is essentially formed to be symmetric, the configuration of the sun roof apparatus 10 will be described below with a right side portion of the sun roof apparatus 10 as an example.

As illustrated in FIG. 2, the roof panel 1 includes a panel main body 1a and a flange portion 1b. The panel main body 1a defines an upper surface of the vehicle roof. The flange portion 1b downwardly extends from a rear end portion of the panel main body 1a so as to form an opening edge portion of the roof panel 1. A weather strip 90 is provided at the flange portion 1b in order to seal a clearance formed between a side surface of the flange portion 1b (i.e. a side surface of the flange portion 1b facing the right in FIG. 2) and a front edge portion 12a of the movable panel 12.

A guide rail 20, which is formed to extend in the front-rear direction, is fixed on the movable panel 12 so as to be located below the movable panel 12. A front guide member 30 is attached at a front portion of a bottom portion 21 of the guide rail 20. Furthermore, a drive shoe 40 is provided at the guide rail 20 so as to be positioned behind the front guide member 30 while allowing the drive shoe 40 to be movable in the front-rear direction along the guide rail 20. Still further, a front link member 50 and a rear link member 60 are supported by the guide rail 20 while allowing the front link member 50 and the rear link member 60 to be slidable along the guide rail

20. A functional bracket 70, which supports the movable panel 12, is connected to the front link member 50 and the rear link member 60 while being positioned above the front link member 50 and the rear link member 60 in an up-and-down direction.

The front guide member 30 includes a front groove portion 32, an inclined groove portion 34 and a rear groove portion 36. The front groove portion 32 is formed so as to extend in the front-rear direction. The inclined groove portion 34 continuously extends from a rear end portion of the front groove portion 32 and extends in a diagonally rearward and upward direction. The rear groove portion 36 continuously extends from a rear end portion of the inclined groove portion 34 and extends in the front-rear direction. The successive groove including the front groove portion 32, the inclined groove portion 34 and the rear groove portion 36 is defined by an upper support surface 30a (i.e. a first support surface), a lower support surface 30b (i.e. a second support surface), which is located below the upper support surface 30a, and a front restriction surface 30c, which connects a front end portion of the upper support surface 30a and a front end portion of the lower support surface 30b. The front groove portion 32 is located downwardly of the bottom portion 21, which is located at the lowermost position of the guide rail 20. Furthermore, a front end portion of the front groove portion 32 is closed by the front restriction surface 30c. The rear groove portion 36 is located upwardly of the bottom portion 21. Furthermore, a rear end portion of the rear groove portion 36 is opened (is not closed).

The drive shoe 40 includes a shoe main body 42 (i.e. a main body of the drive shoe 40) and two grooves (a first groove portion 44 and a second groove portion 46. The shoe main body 42 is formed in a flat plate shape extending in the front-rear direction. The first groove portion 44 and the second groove portion 46 are formed on an inner side surface of the shoe main body 42 so as to extend in the front-rear direction. Additionally, a belt 100, which is driven by an electric motor so as to be moved in the front-rear direction, is connected to the shoe main body 42.

The first groove portion 44 includes a rear groove 44a and a front groove 44b. The rear groove 44a is formed to extend in the front-rear direction. The front groove 44b continuously extends from a front end portion of the rear groove 44a and extends in a diagonally forward and upward direction. A rear end portion of the rear groove 44a and a front end portion of the front groove 44b are both closed.

The second groove portion 46 is formed on the shoe main body 42 so as to be located rearwardly of the first groove portion 44 and so as to be independently of and separately from the first groove portion 44. The second groove portion 46 includes a rear longitudinal groove 46a, an inclined rear grove 46b, an intermediate longitudinal groove 46c, an inclined front groove 46d and a front longitudinal groove 46e. The rear longitudinal groove 46a is formed to extend in the front-rear direction. The inclined rear groove 46b continuously extends from a front end portion of the rear longitudinal groove 46a and extends in the diagonally forward and upward direction. The intermediate longitudinal grove 46c continuously extends from a front end portion of the inclined rear groove 46b and extends in the front-rear direction. The inclined front groove 46d continuously extends from a front end portion of the intermediate longitudinal groove 46c and extends in the diagonally forward and upward direction. The front longitudinal groove 46e continuously extends from a front end portion of the inclined front groove 46d and extends in the front-rear direction. A rear end portion of the rear longitudinal groove 46a and a front end portion of the front longitudinal groove 46e are both closed.

The front link member 50 is formed in a substantially flat plate shape. More specifically, the front link member 50 is formed to have a triangular shape when being viewed from a side thereof. While the sun roof apparatus 10 is in the fully-closed state, a link member main body 51 (i.e. a main body of the front link member 50) is turned to be in a state where a portion of the link member main body 51 corresponding to a longitudinal side thereof extends in the front-rear direction.

The front link member 50 mainly includes a link member front portion 51a, at which a front connecting pin 52 (i.e. a connecting portion) is provided, a link member main body portion 51b, at which a front engagement pin 54 (i.e. an engagement portion), a front support pin 56 (i.e. a supporting portion) and a restriction pin 58 are provided, and a link member connecting portion connecting the link member front portion 51a and the link member main body portion 51b.

The front connecting pin 52 is provided in the vicinity of an apex of the front link member 50 located at the foremost among three apexes thereof in a manner that the front connecting pin 52 protrudes in the vehicle width direction from a side surface of the link member front portion 51a. Furthermore, the front connecting pin 52 is connected to a front rotating portion 72, which is formed at a front end portion of the functional bracket 70, while allowing the front connecting pin 52 to be relatively rotatable.

The front engagement pin 54 is provided at the link member main body 51 so as to be positioned in the vicinity of an apex located in the rearmost position among three apexes of the front link member 50 and so as to protrude in the vehicle width direction from the side surface of the link member main body portion 51b. The front engagement pin 54 is inserted into the first groove portion 44 of the drive shoe 40 while allowing the front engagement pin 54 to be slidably movable within the first groove portion 44, so that the front link member 50 is rotatable relative to the drive shoe 40. While the sun roof apparatus 10 is in the fully-closed state, the front engagement pin 54 is located within the rear groove 44a, more specifically, at the rear end portion of the rear groove 44a.

The front support pin 56 is arranged between the front connecting pin 52 and the front engagement pin 54 in the front-rear direction. Furthermore, the front support pin 56 is provided in the vicinity of an apex of the front link member 50 located downwardly of the front connecting pin 52 and the front engagement pin 54 so as to protrude from the side surface of the link member main body portion 51b in the vehicle width direction. The front support pin 56 is inserted into the front guide member 30. In other words, the front support pin 56 is rotatably supported by the front guide member 30. While the sun roof apparatus 10 is in the fully-closed state, the front support pin 56 is located within the front groove portion 32, more specifically, at the front end portion of the front groove portion 32.

The restriction pin 58 is formed on the front link member 50 so as to be positioned slightly below the front engagement pin 54 and so as to be positioned slightly forward of the front engagement pin 54. While the sun roof apparatus 10 is in the fully-closed state, the restriction pin 58 is located in front of a restriction block 80, which is fixed on the bottom portion 21 of the guide rail 20, so as to be in contact with a rear restriction surface 80a, which is a front end surface of the restriction block 80 in the front-rear direction. The rear restriction surface 80a is located right below the front engagement pin 54. Furthermore, the restriction block 80 includes a guide surface 80b, which extends in the diagonally rearward and upward direction from an upper end portion of the rear restriction surface 80a.

The rear link member 60 includes a link member main body 61, which is formed in a flat plate shape and in a triangular shape when being viewed from a side thereof and three pins (i.e. a rear connecting pin 62, a rear engagement pin 64 and a rear support pin 66), which protrude from a side surface of the link member main body 61 in the vehicle width direction. While the sun roof apparatus 10 is in the fully-closed state, the link member main body 61 is turned to be in a state where a portion of the link member main body 61 corresponding to a longitudinal side thereof extends in the front-rear direction.

The rear connecting pin 62 is provided at a portion in the vicinity of an apex located at the rearmost among three apexes of the link member main body 61. Furthermore, the rear connecting pin 62 is connected to a rear rotating portion 74, which is formed at a rear portion of the functional bracket 70, so as to be rotatable relative to the rear rotating portion 74 of the functional bracket 70. Additionally, the rear connecting pin 62 serves as a rear connecting portion.

The rear support pin 66 is provided at a portion in the vicinity of an apex located at the foremost among the three apexes of the link member main body 61. The rear support pin 66 is rotatably supported at the guide rail 20. The rear engagement pin 64 is provided between the rear connecting pin 62 and the rear engagement pin 64 in the front-rear direction. More specifically, the rear engagement pin 64 is provided at an apex of the rear link member 60 located downwardly of the rear connecting pin 62 and the rear engagement pin 64. Furthermore, the rear engagement pin 64 is inserted into the second groove portion 46 of the drive shoe 40. The rear engagement pin 64 is located within the rear longitudinal groove 46a, more specifically, at the rear portion of the rear longitudinal groove 46a while the sun roof apparatus 10 is in the fully-closed state. Additionally, the rear engagement pin 64 serves as a rear engagement portion.

An internal structure of the guide rail 20 and a positional relationship between the guide rail 20 and each component will be described below with reference to FIGS. 3 to 6.

As illustrated in FIGS. 3 to 6, the guide rail 20 is formed to have substantially the same shape at any positions thereof in the front-rear direction except for a portion of the guide rail 20 where the front guide member 30 is provided. More specifically, the guide rail 20 includes the bottom portion 21, which is located at the lowermost portion of the guide rail 20, an outwardly inclined wall portion 22a, an outer wall portion 22b and an inner wall portion 23. The outwardly inclined wall portion 22a is connected to an outer end portion of the bottom portion 21 and extends in the diagonally upward and outward direction. The outer wall portion 22b upwardly extends from an upper end portion of the outwardly inclined wall portion 22a. The inner wall portion 23 is connected to an inner end portion of the bottom portion 21 and upwardly extends from the inner end portion. The inner end portion of the bottom portion 21 is located inwardly of a right edge portion 12b of the movable panel 12 in the vehicle width direction. On the other hand, the outer end portion of the bottom portion 21 is located outwardly of the flange portion 1b of the roof panel 1.

Figure 3:
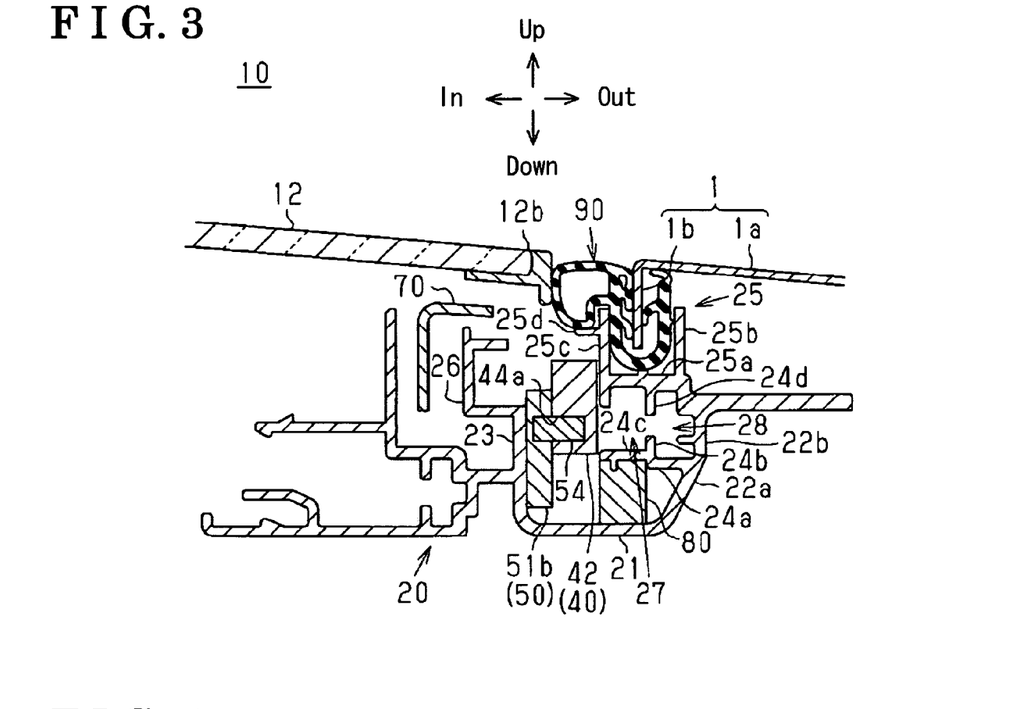
FIG. 3 is a cross-sectional diagram illustrating the configuration of the sun roof apparatus taken along line III-III in FIG. 2.

As illustrated in FIG. 3, the weather strip 90 is provided between the flange portion 1b of the roof panel 1 and the right edge portion 12b of the movable panel 12 in order to seal a clearance formed therebetween. The drive shoe 40 is provided so as to be located downwardly of the weather strip 90.

A holding portion 25 for holding the weather strip 90 is connected at an upper end portion of the outer wall portion 22b. The holding portion 25 includes a lateral wall portion 25a, an outer vertical wall portion 25b, an inner vertical wall portion 25c and an inwardly extending portion 25d. The lateral wall portion 25a inwardly extends from the upper end portion of the outer wall portion 22b. The outer vertical wall portion 25b upwardly extends from the upper end portion of the outer wall portion 22b. The inner vertical wall portion 25c upwardly and downwardly extends from an inner end portion of the lateral wall portion 25a. The inwardly extending portion 25d inwardly extends from a side surface of the inner vertical wall portion 25c. The flange portion 1b is position in a clearance formed between the outer vertical wall portion 25b and the inner vertical wall portion 25c.

A first partition wall portion 24a is formed at a lower end portion of the outer wall portion 22b so as to inwardly extend therefrom. A second partition wall portion 24b is formed at an inner end portion of the first partition wall portion 24a so as to upwardly extend therefrom. A third partition wall portion 24c is formed on a side surface of the second partition wall portion 24b so as to inwardly extend therefrom. A fourth partition wall portion 24d is formed on a lower surface of the lateral wall portion 25a so as to downwardly extend therefrom. An inner end portion of the third partition wall portion 24c is located right below the inner vertical wall portion 25c of the holding portion 25. Furthermore, the second partition wall portion 24b is located right below the fourth partition wall portion 24d.

The lateral wall portion 25a, the inner vertical wall portion 25c, the second partition wall portion 24b, the third partition wall portion 24c and the fourth partition wall portion 24d configure a shoe guide portion 27, which is formed to be engaged with an engagement protruding portion 48 of the drive shoe 40 in order to guide the drive shoe 40. Additionally, the outer wall portion 22b, the first partition wall portion 24a, the second partition wall portion 24b, the fourth partition wall portion 24d and the lateral wall portion 25a configure a belt supporting portion 28 for supporting the belt 100.

Figure 4:
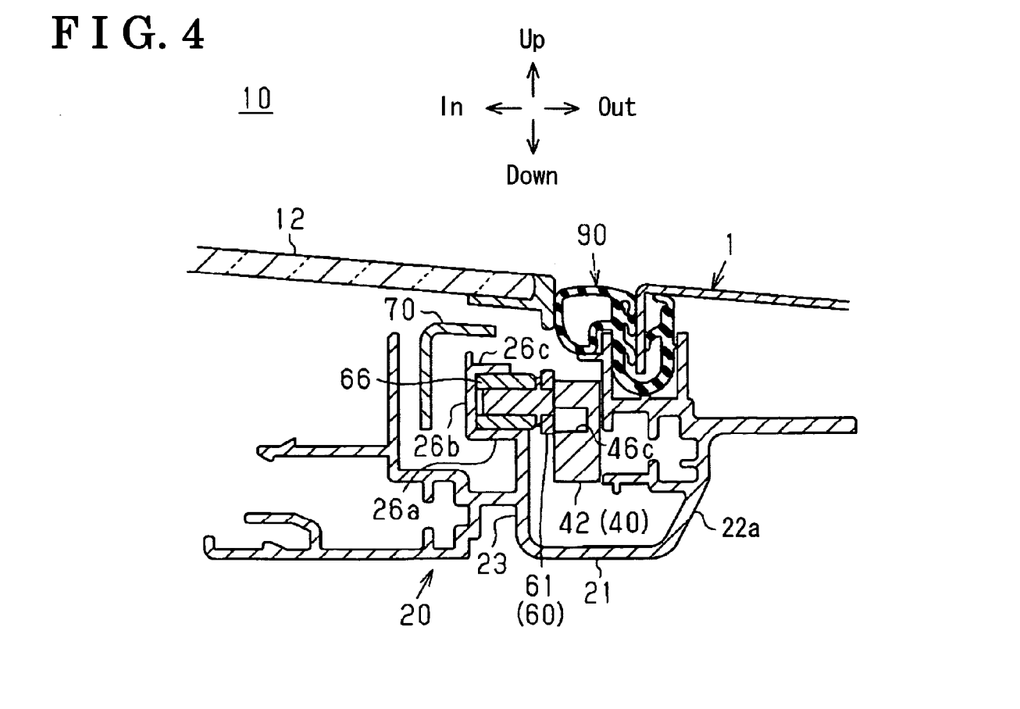
FIG. 4 is a cross-sectional diagram illustrating the configuration of the sun roof apparatus taken along line IV-IV in FIG. 2.

As illustrated in FIGS. 3 and 4, a first supporting wall portion 26a is formed at an upper end portion of the inner wall portion 23 so as to inwardly extend therefrom. A second supporting wall portion 26b is formed on an inner end portion of the first supporting wall portion 26a so as to upwardly extend therefrom. A third supporting wall portion 26c is formed at an upper end portion of the second supporting wall portion 26b so as to outwardly extend therefrom. An outer end portion of the third supporting wall portion 26c is located inwardly of the inner wall portion 23.

The first supporting wall portion 26a, the second supporting wall portion 26b and the third supporting wall portion 26c configure a supporting wall portion 26 for supporting the front support pin 56 of the front link member 50 and the rear support pin 66 of the rear link member 60. As illustrated in FIGS. 3 to 6, the supporting wall portion 26 is arranged at a position inwardly of an outer end surface of the movable panel 12. The front link member 50 is provided between the supporting wall portion 26 of the guide rail 20 and the drive shoe 40 in the vehicle width direction. Additionally, the rear support pin 66 serves as a rear support portion.

As illustrated in FIG. 3, the restriction block 80 is fixed on the guide rail 20 at a position in the vicinity of the front engagement pin 54 so as to be positioned between the bottom portion 21 and the third partition wall portion 24c in the up-and-down direction. Additionally, the front link member 50 and the drive shoe 40 are positioned between the inner wall portion 23 on the one hand and the inner vertical wall portion 25c and the third partition wall portion 24c in the vehicle width direction.

As illustrated in FIG. 4, the link member main body 61 of the rear link member 60 is positioned in the vicinity of the rear support pin 66 so as to be located between the inner wall portion 23 and the drive shoe 40 in the vehicle width direction. The rear support pin 66, which inwardly protrudes from the side surface of the link member main body 61, is inserted into a clearance formed at the supporting wall portion 26 (i.e. a clearance defined by the first, second and third supporting wall portions 26a, 26b and 26c).

Figure 5:
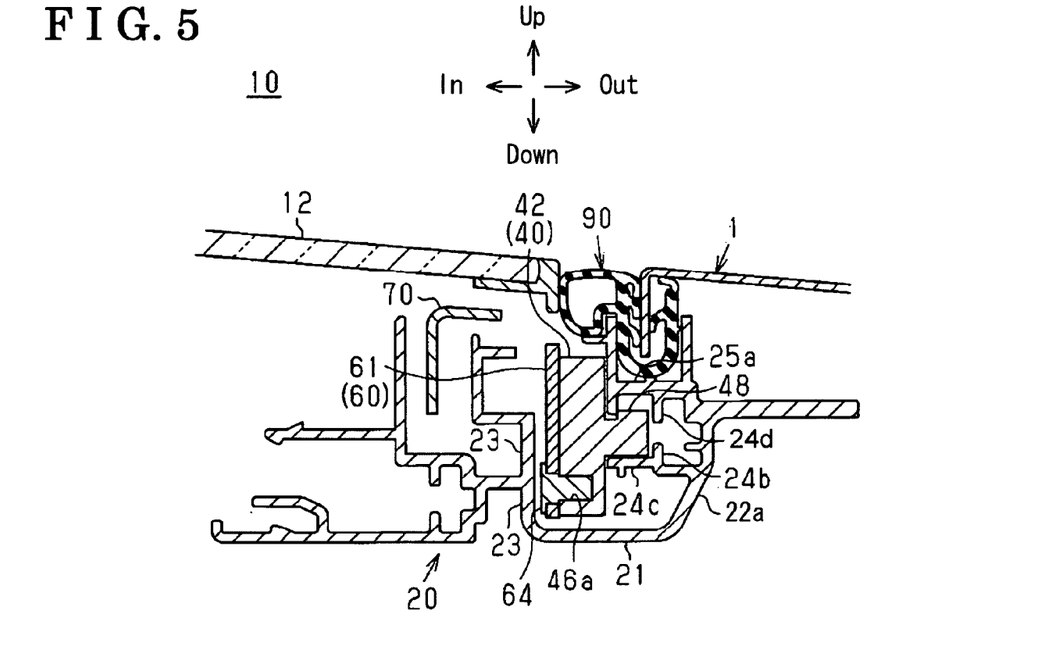
FIG. 5 is a cross-sectional diagram illustrating the configuration of the sun roof apparatus taken along line V-V in FIG. 2.

As illustrated in FIG. 5, the engagement protruding portion 48, which is provided at the side surface of the shoe main body 42 so as to outwardly protrude therefrom, is supported by the shoe guide portion 27 at a position where the rear engagement pin 64 is provided. More specifically, an end portion of the engagement protruding portion 48 is formed to be enlarged in an upward direction when comparing to a base end portion thereof, so that the end portion engages with the inner vertical wall portion 25c. Accordingly, a displacement of the drive shoe 40 in the vehicle width direction and in the up-and-down direction may become avoidable. Furthermore, the rear engagement pin 64 of the rear link member 60 is inserted into the rear longitudinal groove 46a of the drive shoe 40.

Figure 6:
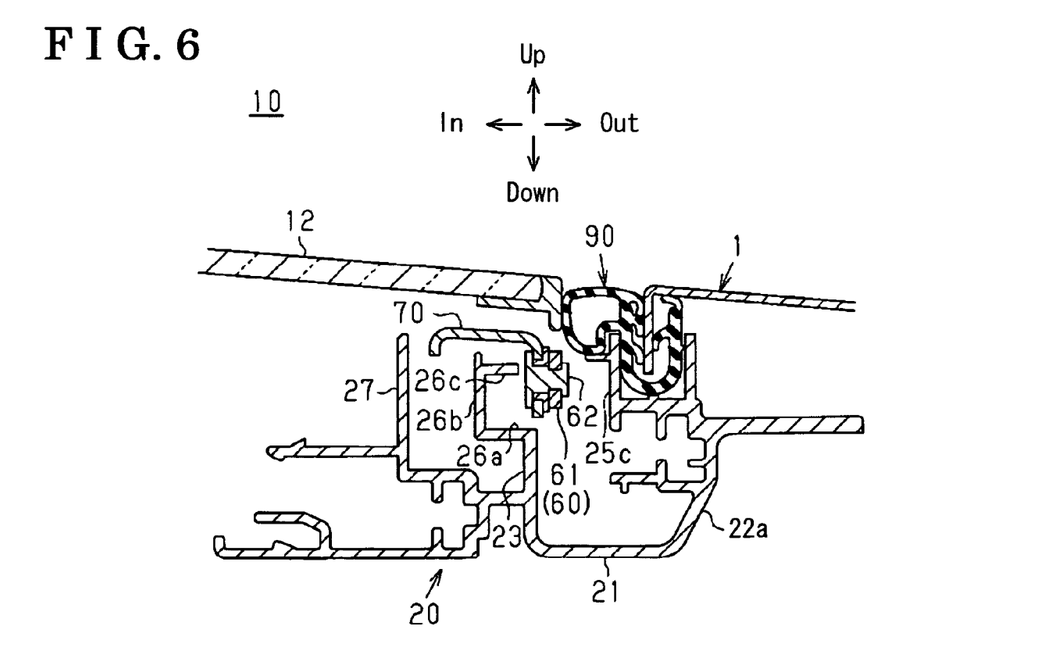
FIG. 6 is a cross-sectional diagram illustrating the configuration of the sun roof apparatus taken along line VI-VI in FIG. 2.

As illustrated in FIG. 6, the functional bracket 70 is located inwardly of the rear link member 60 at a position where the rear connecting pin 62 is provided and is connected to the rear link member 60 via the rear connecting pin 62.

A configuration of the weather strip 90 will be described below with reference to FIG. 7. A state of the weather strip 90 before being attached is indicated by a chain double-dashed line in FIG. 7. The weather strip 90 has a substantially same shape as the weather strip 90 illustrated in FIG. 2.

Figure 7:
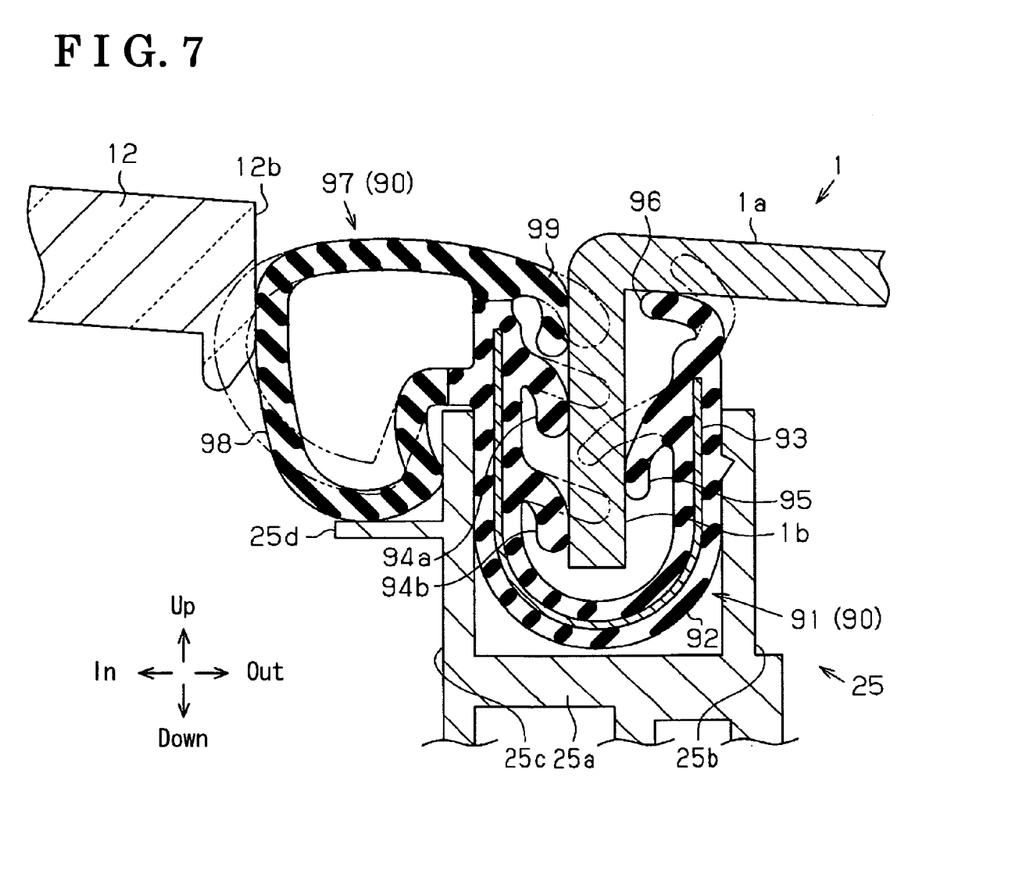
FIG. 7 is a cross-sectional diagram illustrating the configuration of the sun roof apparatus centering on a weather strip when being viewed in the vehicle width direction.

As illustrated in FIG. 7, the weather strip 90 made of a rubber material includes a base portion 91 enclosing the flange portion 1b of the roof panel 1. The base portion 91 is supported from a bottom thereof by means of the holding portion 25.

More specifically, the base portion 91 is formed to have a U-shape in cross section and to have a base portion main body 92, whose inner end portion (i.e. a left upper end portion of the base portion 91 in FIG. 7) is connected with a sealing portion 97, and a core 93 embedded into the base portion main body 92 and having a U-shape in cross section. The inner vertical wall portion 25c is positioned inwardly of the flange portion 1b. On the other hand, the outer vertical wall portion 25b is positioned outwardly of the flange portion 1b. Additionally, plural protrusions (first and second inner protrusions 94a and 94b, and an outer protrusion 95), which extend in a diagonally downward direction from an inner circumferential surface of the base portion main body 92, are formed on the base portion 91. Furthermore, an upper protrusion 96 is formed at an outer end portion of the base portion main body 92 (i.e. at a right upper end portion of the base portion main body 92 in FIG. 7).

The sealing portion 97 is formed to have a substantially C-shape in cross section and to include a sealing portion main body 98, whose both end portions are connected to the base portion main body 92, and a protruding portion 99, which is connected to the sealing portion main body 98. An inner space is defined by an inner circumferential surface of the sealing portion main body 98 and an outer circumferential surface of the base portion main body 92.

The sealing portion 97 is formed to contact an outer circumferential surface of the sealing portion main body 98, specifically, a side surface of the sealing portion 97 contacts the right edge portion 12b of the movable panel 12 while the movable panel 12 is in the fully-closed state. Furthermore, while the sealing portion 97 is deformed by being pushed by the movable panel 12, a lower surface of the sealing portion main body 98 contacts an upper surface of the inwardly extending portion 25d.

Figure 8:
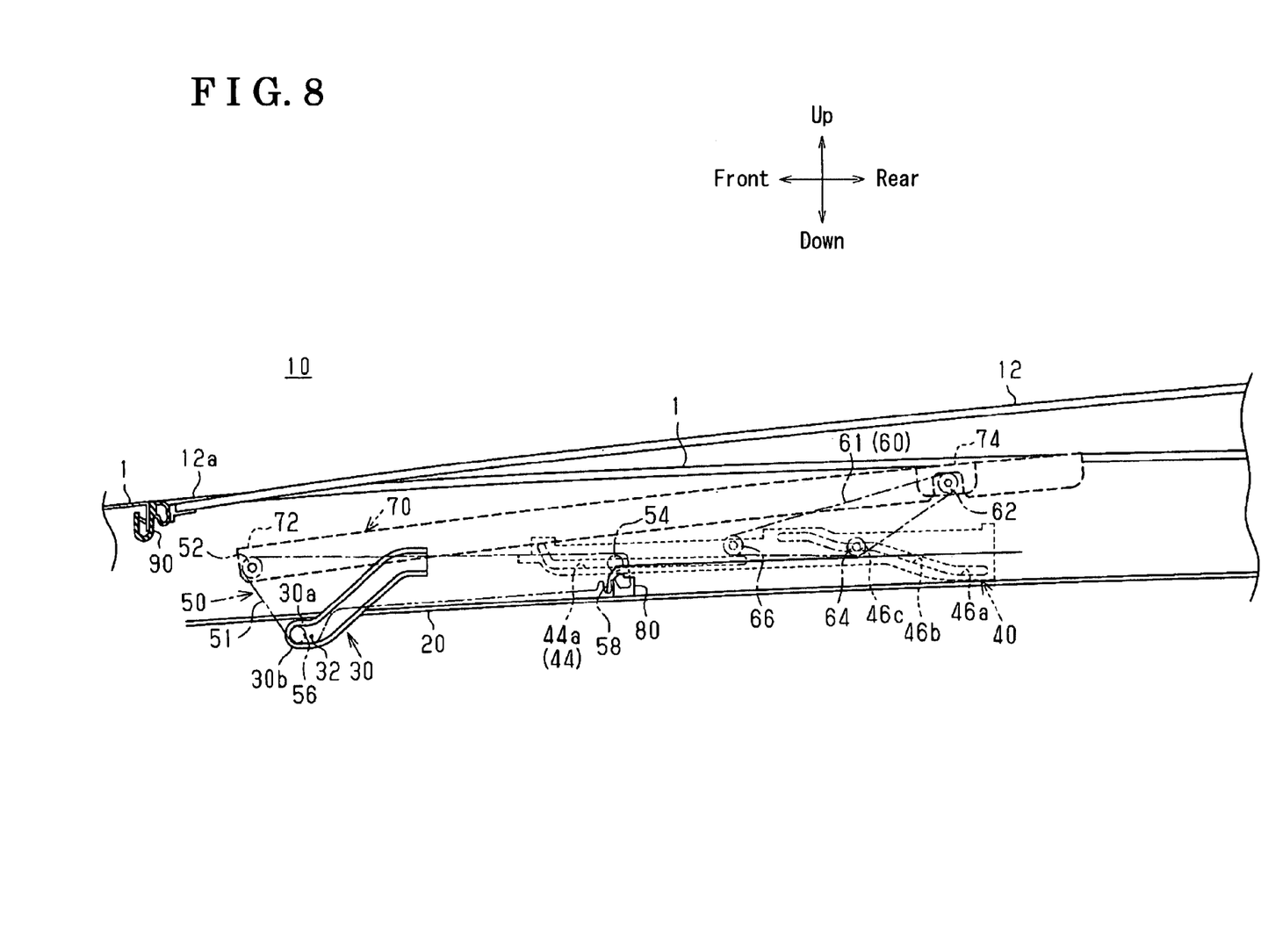
FIG. 8 is a cross-sectional diagram illustrating the configuration of the sun roof apparatus centering on the movable panel in a state where a tilt-up operation is completed when being viewed in the vehicle width direction.

A tilt-up operation of the movable panel 12 will be described below with reference to FIG. 8. Illustrated in FIG. 8 is a vertical sectional view of the sun roof apparatus 10 centering on the movable panel 12 in a state where the tilt-up operation is completed. As is the case with FIG. 2, different components are indicated by different types of lines in FIG. 8.

As illustrated in FIG. 8, in a case where the drive shoe 40 is rearwardly moved while the sun roof apparatus 10 is in the fully-closed state, the front engagement pin 54 is relatively displaced within the rear groove 44a of the first groove portion 44 in a forward direction in response to the movement of the drive shoe 40. However, in this stage, the front link member 50 is not actually displaced in the rearward direction even when the drive shoe 40 is rearwardly moved.

On the other hand, in this case, the rear engagement pin 64 is relatively and forwardly moved within the rear longitudinal groove 46a, the inclined rear groove 46b and the intermediate longitudinal groove 46c of the second groove portion 46 in the above-mentioned order. The second groove portion 46 is formed to extend diagonally upwardly towards the front end portion thereof. Therefore, the rear engagement pin 64 is upwardly displaced in response to the displacement of the drive shoe 40 in the rearward direction. Furthermore, the rear link member 60 is rotated about the rear support pin 66 in a counterclockwise direction in FIG. 8 without being displaced in the rearward direction. In other words, the rear link member 60 upwardly lifts the rear end portion of the functional bracket 70 in a manner that the rear support pin 66 is guided by the supporting wall portion 26 of the guide rail 20 and the rear engagement pin 64 is guided to be displaced by the second groove portion 46.

Accordingly, the functional bracket 70 rotates about the front rotating portion 72 in the counterclockwise direction so as to lift up the rear end portion of the functional bracket 70 without being displaced in the rearward direction. In other words, the functional bracket 70 performs the tilt-up operation in the above-described manner.

Until the tilt-up operation is completed from the fully-closed state, the upper support surface 30a and the lower support surface 30b of the front groove portion 32 are closely located upwardly and downwardly of the front support pin 56, respectively. Therefore, the front support pin 56 is upwardly and downwardly supported by the front guide member 30 in the vertical direction.

The movable panel 12 is rotated about the front connecting pin 52 in response to the tilt-up operation. Therefore, in a process of the movable panel 12 being rotated, the front edge portion 12a of the movable panel 12 forwardly and downwardly presses the weather strip 90, which is arranged in front of the front edge portion 12a in the front-rear direction. Generally, in a case where the weather strip 90 is repeatedly pushed with large force applied thereto, the weather strip 90 deteriorates. In order to avoid the deterioration of the weather strip 90, the flange portion 1b of the roof panel 1 may need to be forwardly displaced.

However, according to this embodiment, the sun roof panel 10 is configured so that the front connecting pin 52 is located between the front edge portion 12a and the front support pin 56 in the front-rear direction and is located between the front edge portion 12a and the front support pin 56 in the up-and-down direction in the process of the tilt-up operation, so that the deterioration of the weather strip 90 is reduced.

A pop-up operation of the movable panel 12 will be described below with reference to FIG. 9. Furthermore, a slide operation of the movable panel 12 will be described below with reference to FIG. 10. The pop-up operation is carried out before the slide operation of the movable panel 12. Furthermore, in the pop-up operation, the front edge portion 12a of the movable panel 12 is further raised while the movable panel 12 is rearwardly moved from a state thereof where the tilt-up operation is completed.

Figure 9:
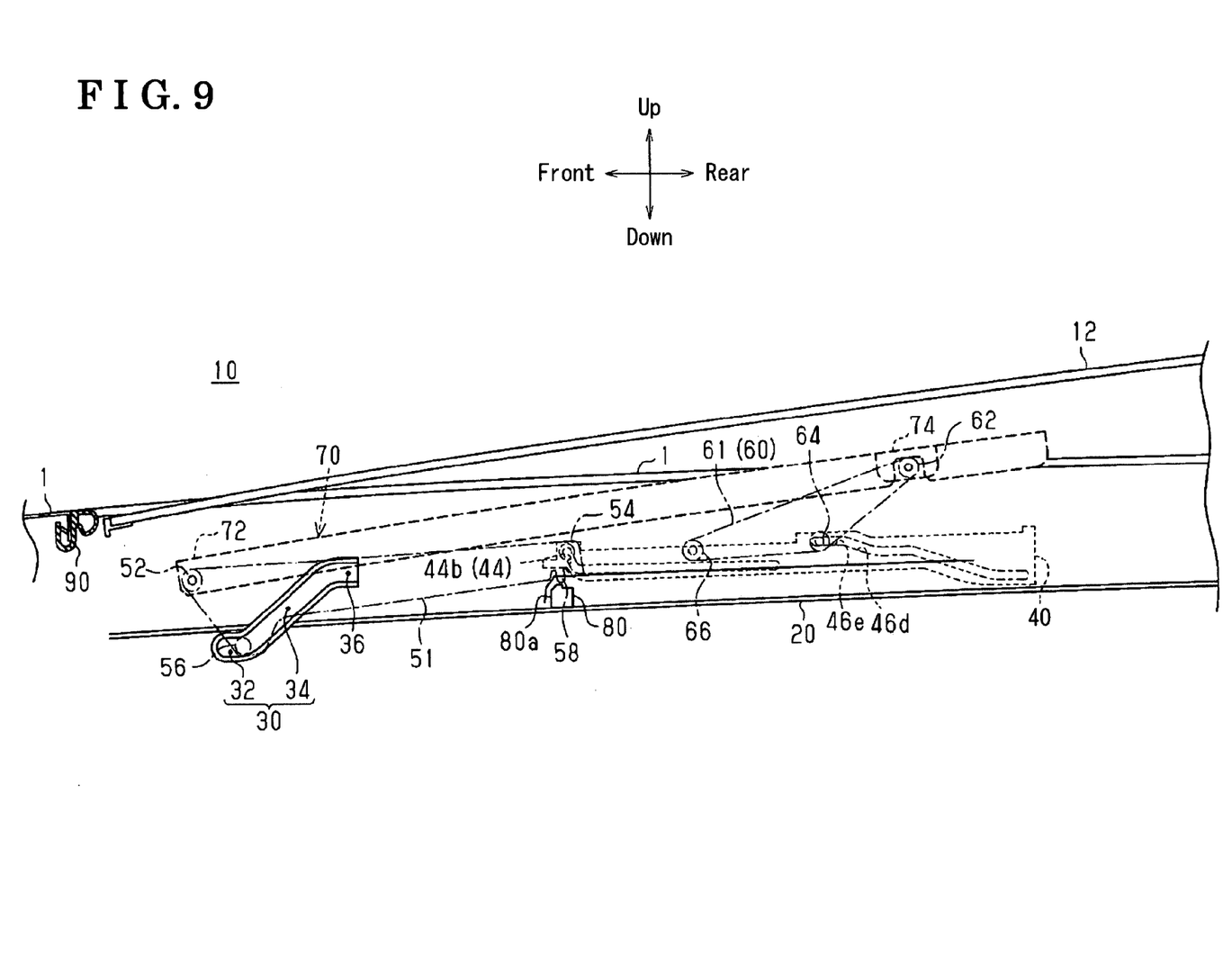
FIG. 9 is a cross-sectional diagram illustrating the configuration of the sun roof apparatus centering on the movable panel in a process of a pop-up operation when being viewed in the vehicle width direction.
Figure 10:
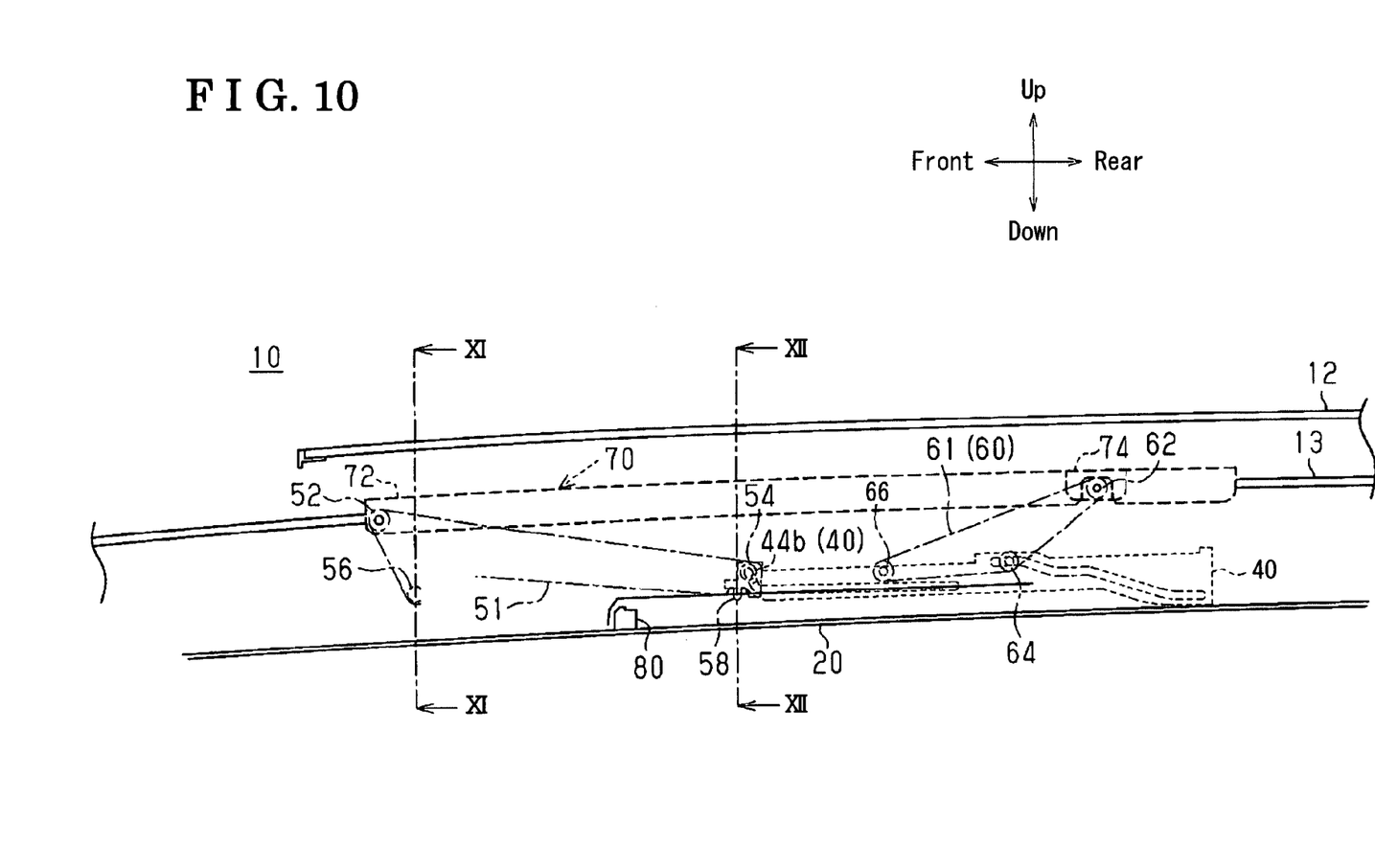
FIG. 10 is a cross-sectional diagram illustrating the configuration of the sun roof apparatus centering on the movable panel in a state where a slide operation is completed when being viewed in the vehicle width direction.

Illustrated in FIG. 9 is the cross-sectional diagram of the sun roof apparatus 10 centering on the movable panel 12 in a process of the pop-up operation when being viewed in the vehicle width direction. Illustrated in FIG. 10 is the cross-sectional diagram of the sun roof apparatus 10 centering on the movable panel 12 in a state where the slide operation is completed when being viewed in the vehicle width direction. As is the case with FIG. 2, different types of lines are used for different components of the sun roof apparatus 10 in FIGS. 9 and 10.

As illustrated in FIG. 9, in a case where the drive shoe 40 is rearwardly displaced from the state where the tilt-up operation is completed, the front engagement pin 54 is relatively displaced from the rear groove 44a to the front grove 44b of the first groove portion 44 and is eventually displaced to the front end portion of the front groove 44b in response to the rearward displacement of the drive shoe 40. In this case, the restriction pin 58 is displaced in the diagonally rearward and upward direction along the guide surface 80b of the restriction block 80. Furthermore, in this case, the front support pin 56 is rearwardly displaced within the front groove portion 32 so as to be displaced up to the rear end portion of the front groove portion 32. Accordingly, the front link member 50 is rotated about the front support pin 56 in the counterclockwise direction while being rearwardly displaced. In other words, the front link member 50 lifts the front end portion of the functional bracket 70 in a manner that the front engagement pin 54 is guided by the first groove portion 44 of the drive shoe 40 and the front support pin 56 is guided by the front guide member 30 so as to displace the front link member 50.

On the other hand, in this case, the rear engagement pin 64 is relatively and forwardly moved within the inclined front groove 46d and the front longitudinal groove 46e in the above-mentioned order so that the rear engagement pin 64 is eventually moved up to the front end portion of the front longitudinal groove 46e. As described above, the second groove portion 46 is formed so as to extend in the diagonally upward direction towards the front portion thereof. Therefore, in the case where the drive shoe 40 is rearwardly displaced, the rear engagement pin 64 is upwardly displaced in response to the rearward displacement of the drive shoe 40. Accordingly, the rear link member 60 is rotated about the rear support pin 66 in the counterclockwise direction while being rearwardly displaced.

Accordingly, the functional bracket 70 is rotated about the front rotating portion 72 in the counterclockwise direction so that the rear end portion thereof is lifted up while the functional bracket 70 is rearwardly displaced. According to the embodiment, because the front engagement pin 54 is engaged with the front groove 44b at the front end portion thereof, in the case where the drive shoe 40 is further rearwardly displaced from the state illustrated in FIG. 9, the front link member 50 is also rearwardly displaced in response to the rearward displacement of the drive shoe 40. Furthermore, in this case, the front support pin 56 is rearwardly displaced within the inclined groove portion 34 and the rear groove portion 36 of the front guide member 30 in the above-mentioned order, so that the front support pin 56 is displaced up to the rear end portion of the rear groove portion 36. Accordingly, the front link member 50 is rotated about the front engagement pin 54 in a clockwise direction in FIG. 9 while the front link member 50 is being rearwardly displaced.

On the other hand, in this case, the rear link member 60 is rearwardly displaced in response to the rearward displacement of the drive shoe 40. Accordingly, the functional bracket 70 is rotated about the rear rotating portion 74 in the clockwise direction, so that the front end portion of the functional bracket 70 is lifted up while being rearwardly displaced. As a result, the movable panel 12 is turned to be in a state where the movable panel 12 extends along the roof panel 1 in the front-rear direction, hence, the pop-up operation is completed.

As illustrated in FIG. 10, in a case where the drive shoe 40 is further rearwardly displaced from the state where the pop-up operation is completed, the movable panel 12 is rearwardly slid in response to the rearward displacement of the drive shoe 40.

A positional relationship between the guide rail 20 and each component will be described below in detail with reference to FIGS. 11 and 12.

Figure 11:
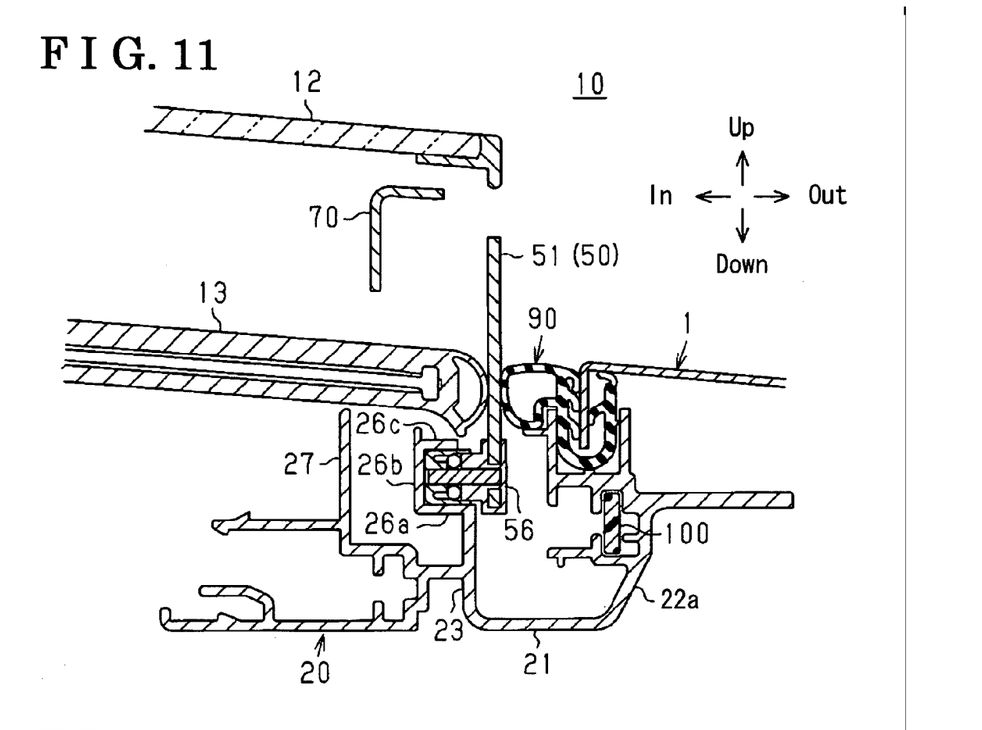
FIG. 11 is a cross-sectional diagram illustrating the configuration of the sun roof apparatus taken along line XI-XI in FIG. 10.

As illustrated in FIG. 11, the front support pin 56 is inserted into a recess formed at the support wall portion 26 of the guide rail 20. The support wall portion 26 is connected to the rear end portion of the rear groove portion 36 of the front guide member 30. Therefore, the front support pin 56 is allowed to be moved from the rear groove portion 36 to the support wall portion 26. As illustrated in FIG. 11, the front support pin 56 of the front link member 50 is located inwardly of the outer end surface of the movable panel 12.

Figure 12:
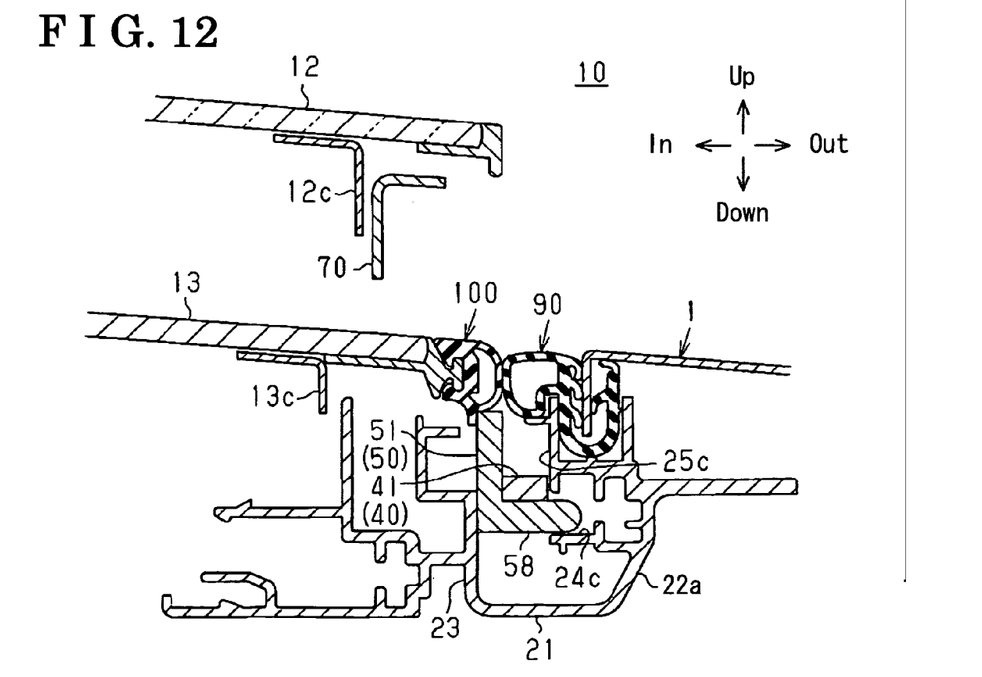
FIG. 12 is a cross-sectional diagram illustrating the configuration of the sun roof apparatus taken along line XII-XII in FIG. 10.

As illustrated in FIG. 12, the restriction pin 58, which outwardly protrudes from a lower portion of the front link member 50, is supported by the shoe guide portion 27. In this case, a lower surface of the shoe main body 42 contacts an upper surface of the restriction pin 58.

In the first embodiment, the front guide member 30 serves as a first guide portion. The first groove portion 44 serves as a second guide portion. The supporting wall portion 26 of the guide rail 20 serves as a third guide portion. The second groove portion 46 serves as a fourth guide portion. Furthermore, the restriction pin 58 of the front link member 50 serves as a restriction protruding portion. The rear link member 60, the supporting wall portion 26 of the guide rail 20 and the second groove portion 46 of the drive shoe 40 configure a lifting mechanism.

According to the embodiment, following advantages and merits may be achieved. According to the embodiment, the sun roof apparatus 10 is configured so as to include the guide rail 20, which is fixed on the roof panel 1 and extends in the front-rear direction of the vehicle, the drive shoe 40, which is driven so as to move in the front-rear direction along the guide rail 20, and the functional bracket 70, which supports the movable panel 12. Furthermore, the sun roof apparatus 10 includes the front link member 50 having the front connecting pin 52, which is connected to the front portion of the functional bracket 70 so as to be rotatable relative to the functional bracket 70, the front engagement pin 54, which is located rearwardly of the front connecting pin 52 and engages with the drive shoe 40 so as to be rotatable relative to the drive shoe 40, and the front support pin 56, which is located forwardly of the front engagement pin 54 and is rotatably supported by the guide rail 20. Still further, the sun roof apparatus 10 includes the rear link member 60, which is connected at the rear portion of the functional bracket 70 and which lifts up the rear portion of the functional bracket 70 in response to the displacement of the drive shoe 40. The guide rail 20 is provided with the front guide member 30, which is configured so as to guide the front support pin 56 to be displaced in response to the opening and closing operation of the movable panel 12 and is closely located in the vicinity of the front support pin 56 so as to be positioned upwardly and downwardly thereof while the movable panel 12 is in the fully-closed state. The first guide portion 44 is formed at the drive shoe 40 in order to guide the front engagement pin 54 to be displaced in response to the opening and closing operation of the movable panel 12. Furthermore, the first guide portion 44 is formed so as to be closely located in the vicinity of the front engagement pin 54, more specifically, so as to be closely located upwardly and downwardly of the front engagement pin 54 while the movable panel 12 is in the fully-closed state.

Accordingly, the front support pin 56 of the front guide member 30 controls the front link member 50, which supports the functional bracket 70, so as not to be displaced in the up-and-down direction. Furthermore, the front engagement pin 54, which is located rearwardly of the front support pin 56 in the front-rear direction, and the first grove portion 44, which is formed at the drive shoe 40, control the front link member 50 so as not to be displaced in the up-and-down direction. Still further, the longer a distance between the front support pin 56 and the front engagement pin 54 becomes, the more backlash of the functional bracket 70 in the vertical direction may be reduced. Therefore, the backlash of the movable panel 12 in the vertical direction while the sun roof apparatus 10 is in the fully-closed state may be appropriately avoided with a simple configuration of the sun roof apparatus 10.

According to the embodiment, the weather strip 90 is provided at the flange portion 1b, which defines the opening edge portion of the roof panel 1. The front connecting pin 52 of the front link member 50 is located between the front edge portion 12a of the movable panel 12 and the front support pin 56 in the front-rear direction and between the front edge portion 12a of the movable panel 12 and the front supporting pin 56 in the up-and-down direction while the tilt-up operation is carried out. Therefore, a rotation radius of the front edge portion 12a of the movable panel 12 centering on the front connecting pin 52 is appropriately and accurately reduced, which may result in appropriately avoiding a pressing amount of the weather strip 90 (i.e. an amount of the weather strip 90 being pressed) by the front edge portion 12a from increasing. Therefore, a drawback caused due to an increase of the pressing force applied to the weather strip 90, in other words, the deterioration of the weather strip 90 caused by repeatedly being pressed with the large pressing force applied thereto, a rearrangement of the position of the flange portion 1b of the roof panel 1 to be displaced in the forward direction may become avoidable.

According to the embodiment, the front support pin 56 is provided at the link member main body 51 so as to protrude therefrom in the vehicle width direction. Furthermore, the front guide member 30 includes a pair of surfaces (i.e. the upper support surface 30a and the lower support surface 30b), which are distanced away from each other in the vertical direction and which extend in the front-rear direction. The front support pin 56 is located between the upper support surface 30a and the lower support surface 30b while the movable panel 12 is in the fully-closed state. Accordingly, the front link member 50 may appropriately and accurately restrict the displacement of the front support pin 56 in the upward direction and in the downward direction.

According to the embodiment, the front engagement pin 54 is provided at the link member main body 51 of the front link member 50 so as to protrude therefrom in the vehicle width direction. The first groove portion 44 is formed at the shoe main body 42 of the drive shoe 40 so as to extend in the front-rear direction. The front engagement pin 54 is located within the first groove portion 44 while the movable panel 12 is in the fully-closed state. Accordingly, the displacement of the front engagement pin 54 of the front link member 50 in the upward direction and in the downward direction may be appropriately regulated by the first groove portion 44.

According to the embodiment, the restriction pin 58 is provided at the link member main body 51 of the front link member 50 so as to protrude therefrom in the vehicle width direction at the position forwardly of the front engagement pin 54. The restriction block 80, which has the rear restriction surface 80a for restricting the displacement of the restriction pin 58 in the rearward direction in the manner that the rear restriction surface 80a contacts with the restriction pin 58 while the movable panel 12 is in the fully-closed state, is provided at the guide rail 20. Accordingly, while the movable panel 12 is in the fully-closed state, the restriction pin 58 contacts the rear restriction surface 80a of the restriction block 80, thereby appropriately controlling the front link member 50 so as not to be moved in the rearward direction.

According to the embodiment, the front guide member 30 is provided with the front restriction surface 30c, which is configured so as to restrict the movement of the front link member 50 in the forward direction in the manner that the front restriction surface 30c contacts the front support pin 56, while the movable panel 12 is in the fully-closed state. Accordingly, the displacement of the front link member 50 in the forward direction may be appropriately avoided by the front support pin 56 contacting the front restriction surface 30c. Furthermore, in addition to the restriction of the movement of the front link member 50 in the rearward direction by the front support pin 56 contacting the rear restriction surface 80a, the backlash of the functional bracket 70 in the front-rear direction may be further reduced.

According to the embodiment, the sun roof apparatus 10 includes the rear link member 60 having the rear connecting pin 62, which is connected at the rear portion of the functional bracket 70 so as to be rotatable relative to the functional bracket 70, the rear engagement pin 64, which is located forwardly of the rear connecting pin 62 and is engaged with the drive shoe 40 so as to be rotatable relative to the drive shoe 40, and the rear supporting pin 66, which is located forwardly of the rear engagement pin 64 and is rotatably supported by the guide rail 20. The guide rail 20 is provided with the supporting wall portion 26, which is configured so as to guide the rear support pin 66 to be displaced in response to the opening and closing operation of the movable panel 12 and is located in the vicinity of the rear support pin 66 (i.e. so as to be closely located upwardly and downwardly of the rear support pin 66) while the movable panel 12 is in the fully-closed state. Furthermore, the second groove portion 46 (i.e. the rear longitudinal groove 46a) is formed at the drive shoe 40. The displacement of the rear engagement pin 64 is guided by the second groove portion 46 (i.e. the rear longitudinal groove 46a) in response to the opening and closing operation of the movable panel 12. Furthermore, the second groove portion 46 (i.e. the rear longitudinal groove 46a) is located in the vicinity of the rear engagement pin 64 (i.e. closely located upwardly and downwardly of the rear engagement pin 64).

Accordingly, while the sun roof apparatus 10 is in the fully-closed state, because the first supporting wall portion 26a and the third supporting wall portion 26c of the supporting wall portion 26 are closely located upwardly and downwardly of the rear support pin 66, respectively, the rear support pin 66 is supported by the supporting wall portion 26 in the upward and downward directions. Furthermore, because the second groove portion 46 (i.e. the rear longitudinal groove 46a) of the drive shoe 40 is closely located upwardly and downwardly of the rear engagement pin 64, the rear engagement pin 64 is supported by the second groove portion 46 in the upward and downward directions. In other words, the rear link member 60, which supports the functional bracket 70, is configured so as not to be displaced in the upward and downward directions by the rear support pin 66 being engaged with the supporting wall portion 26 and so as not to be displaced in the upward and downward directions by the rear engagement pin 64 being engaged with the second groove portion 46 formed at the drive shoe 40. Therefore, the backlash of the movable panel 12 in the vertical direction while the sun roof apparatus 10 may be further appropriately controlled Additionally, the sun roof apparatus 10 according to the embodiment may be modified as follows.

The configuration of the weather strip 90 is not limited to the above-mentioned embodiment. For example, the holding portion 25 may be configured so that the base portion 91 of the weather strip 90 is held only within a space formed between the inner vertical wall portion 25c and the flange portion 1b instead of the base portion main body 92, which is formed in the U-shape in cross section, being held within the space formed between the outer vertical wall portion 25b and the inner vertical wall portion 25c. In this case, the outer vertical wall portion 25b may be removed from the holding portion 25. Alternatively, the holding portion 25 may be modified so that the base portion 91 of the weather strip 90 is held only within a space formed between the outer vertical wall portion 25b and the flange portion 1b. In this case, the inner vertical wall portion 25c may be removed from the holding portion 25. Still further, the configuration of the base portion 91 of the weather strip 90 may be appropriately changed in response to the configuration of the flange portion 1b of the roof panel 1. In other words, as long as the weather strip 90 is configured so as to be provided between the flange portion 1b of the roof panel 1 and the edge portion of the movable panel 12 and so as to seal the clearance formed therebetween, any desired weather strip including a known weather strip may be adapted.

According to the embodiment, the front restriction surface 30c, which is configured so as to restrict the forward movement of the front link member 50 in the manner that the front support pin 56 of the front link member 50 contacts the front restriction surface 30c while the movable panel 12 is in the fully-closed state, is formed at the front guide member 30 (see FIG. 2). However, the sun roof apparatus 10 may be modified so that a front restriction surface is formed in front of the restriction pin 58 of the front link member 50 while the movable panel 12 is in the fully-closed state in order to contact with the restriction pin 58 thereby restricting the forward movement of the front link member 50. In this case, a member having the front restriction surface may be formed integrally with the restriction block 80 as a unit.

The configuration of the fourth guide portion is not limited to the second groove portion 46 of the drive shoe 40 as disclosed in the above-mentioned embodiment. For example, instead of the second groove portion 46 formed so as to recess at the shoe main body 42 of the drive shoe 40, a portion of the side surface of the shoe main body 42 of the drive shoe 40 may be formed to protrude therefrom in the vehicle width direction in order to form portions that are closely located upwardly and downwardly of the rear engagement pin 64 in the vertical direction while the movable panel 12 is in the fully-closed state, thereby forming the fourth guide portion. In other words, any desired configuration may be adapted as the fourth guide portion as long as the forth guide portion is configured so as to be formed at the drive shoe 40 in order to guide the rear engagement pin 64 to be displaced in response to the opening and closing operation of the movable panel 12 and so as to be closely located upwardly and downwardly of the rear engagement pin 64 in the vertical direction while the movable panel 12 is in the fully-closed state.

The configuration of the third guide portion is not limited to the supporting wall portion 26 of the guide rail 20 as disclosed in the above-mentioned embodiment. For example, any desired configuration of the third guide portion may be adapted as long as the third guide portion is configured so as to be formed at the guide rail 20 in order to guide the rear support pin 66 to be displaced in response to the opening and closing operation and so as to be closely located upwardly and downwardly of the rear support pin 66 of the rear link member 60 in the vertical direction while the movable panel 12 is in the fully-closed state.

The lifting mechanism is not limited to the rear link member 60 and the drive shoe 40 as disclosed in the above-mentioned embodiment. For example, the sun roof apparatus 10 may be configured so that the rear link member 60 is lifted up by means of another drive shoe, which is provided at the sun roof apparatus 10 separately from and independently of the drive shoe 40 driving the front link member 50. In this case, the additionally provided drive shoe of the rear link member 60 may be driven in conjunction with the drive shoe 40 of the front link member 50.

As described above, because the restriction pin 58 is provided at the front link member 50 and the restriction block 80 having the rear restriction surface 80a is fixed at the guide rail 20, the front link member 50 may be appropriately and accurately controlled so as not to be moved in the rearward direction in the manner that the restriction pin 58 contacts the rear restriction surface 80a while the sun roof apparatus 10 is in the fully-closed state. However, in a case that the backlash of the front link member 50 in the front-rear direction while the sun roof apparatus 10 is in the fully-closed state does not cause a drawback, or in a case that the backlash of the front link member 50 in the front-rear direction while the sun roof apparatus 10 is controlled by other means, the restriction block 80, i.e. the rear restriction surface 80a, may be omitted from the sun roof apparatus 10.

As described above, the front restriction surface 30c is formed at the front guide member 30 in order to appropriately and accurately restrict the forward movement of the front link member 50 in the manner that the front support pin 56 contacts the front restriction surface 30c while the movable panel 12 is in the fully-closed state. However, in a case where the backlash of the front link member 50 in the front-rear direction while the sun roof apparatus 10 is in the fully-closed state does not cause a drawback, or in a case where the backlash of the front link member 50 in the front-rear direction while the sun roof apparatus 10 is in the fully-closed state is controlled by other means, the front restriction surface 30c may be removed from the sun roof apparatus 10.

In the above-mentioned embodiment, the weather strip 90 is provided at the opening edge portion of the roof panel 1. However, the weather strip 90 is not limited to the above-mentioned configuration. For example, the weather strip 90 may be provided at the edge portion of the movable panel 12. In the case where the weather strip 90 is provided at the edge portion of the movable panel 12, the weather strip 90, which is provided at the front edge portion of the movable pane 12, is pushed up while being rearwardly pressed by the opening edge portion of the roof panel 1 located forwardly of the weather strip 90 in response to a rotation of the movable panel 12. Generally, in the case where the weather strip 90 is repeatedly pressed with the large pressing force applied thereto, the deterioration of the weather strip 90 may progress. On the other hand, according to the embodiment, the front connecting pin 52 of the front link member 50 is located between the front edge portion of the movable panel 12 and the front support pin 56 in the front-rear direction and between the front edge portion of the movable panel 12 and the front support pin 56 in the vertical direction when the tilt-up operation is carried out. Accordingly, the progression of the deterioration of the weather strip 90 caused by being repeatedly pressed with the large pressing force applied thereto may become avoidable. Furthermore, the opening edge portion of the roof panel 1 may be avoided from being rearranged so as to be displaced in the forward direction in order to avoid the progression of the deterioration of the weather strip 90.

According to the above-described embodiment, because the front connecting pin 52 is located between the front edge portion 12a of the movable panel 12 and the front support pin 56 in the front-rear direction and in the up-and-down direction while the tilt-up operation is carried out, so that the rotation radius of the front edge portion 12a of the movable panel 12 centering on the front connecting pin 52 may be appropriately reduced, which may result in controlling an increase of the pressing amount of the weather strip 90 by the front edge portion 12a. However, in a case where the position where the opening edge portion of the roof panel 1 is formed is displaceable (re-arrangeable) in the forward direction in order to reduce the pressing amount of the weather strip 90, an arrangement position of the front connecting pin 52 may be set at a different position, for example, at a position rearwardly of the front supporting pin 56 in the front-rear direction.

The configuration of the second guide portion is not limited to the first groove portion 44 of the drive shoe 40 as described above as an example. For example, instead of the first groove portion 44 formed at the shoe main body 42 of the drive shoe 40 so as to recess, a portion of the side surface of the shoe main body 42 of the drive shoe 40 may be formed to as to protrude in the vehicle width direction in order to form a protruding portion as the second guide portion, which is closely located upwardly and downwardly of the front engagement pin 54 in the vertical direction while the movable panel 12 is in the fully-closed state. In other words, as long as the second groove portion is formed at the drive shoe 40 and is configured so as to guide the front engagement pin 54 to be displaced in response to the opening and closing operation of the movable panel 12 and so as to be closely located upwardly and downwardly of the front engagement pin 54 in the vertical direction or contact upper and lower portions of the engagement pin 54 in the vertical direction while the movable panel 12 is in the fully-closed state, any desired configuration may be adapted to the second guide portion.

The configuration of the first guide portion is not limited to the front guide member 30 as described above as an example. More specifically, as long as the first guide portion is provided at the guide rail 20 and is configured so as to guide the front supporting pin 56 to be displaced in response to the opening and closing operation of the movable panel 12 and to be closely located upwardly and downwardly of the front supporting pin 56 of the front link member 50 in the vertical direction or contact upper and lower portions of the front supporting pin 56 while the movable panel 12 is in the fully-closed state, any desired configuration may be adapted to the first guide portion.

Technical ideas conceivable from the above-mentioned embodiment and modified examples will be described below.

The sun roof apparatus 10 includes the rear link member 60, which includes the rear connecting pin 62 relatively rotatably connected at the rear portion of the functional bracket 70, the rear engagement pin 64 located forwardly of the rear connecting pin 62 in the front-rear direction of the vehicle and being relatively rotatably engaged with the drive shoe 40, and the rear support pin 66 located forwardly of the rear engagement pin 64 and rotatably supported by the guide rail 20. The guide rail 20 is provided with the third guide portion (i.e. the supporting wall portion 26), which is configured so as to guide the rear support pin 66 to be displaced in response to the opening and closing operation of the movable panel 12 and so as to be closely located upwardly and downwardly of the rear support pin 66 of the rear link member 60 in the vertical direction while the movable panel 12 is in the fully-closed state. The drive shoe 40 is provided with the fourth guide portion (i.e. the second groove portion 46), which is configured so as to guide the rear engagement pin 64 to be displaced in response to the opening and closing operation of the movable panel 12 and so as to be closely located upwardly and downwardly of the rear engagement pin 64 in the vertical direction while the movable panel 12 is in the fully-closed state. The lifting mechanism is configured by the rear link member 60, the third guide portion and the fourth guide portion.

Accordingly, in the case where the drive shoe 40 is rearwardly displaced from the fully-closed state, the rear support pin 66 of the rear link member 60 is guided by the third guide portion (i.e. the supporting wall portion 26) in response to the rearward movement of the drive shoe 40 and the rear engagement pin 64 is guided by the fourth guide portion (i.e. the second groove portion 46) of the drive shoe 40, so that the rear end portion of the functional bracket 70 is lifted up (i.e. a tilt-up mode). While the sun roof apparatus 1 is in the fully-closed state, because the third guide portion is closely located upwardly and downwardly of the rear support pin 66, the upper and lower portions of the rear support pin 66 are supported by the third guide portion, thereby displacement of the rear support pin 66 in the up-and-down direction may become avoidable. Furthermore, because the fourth guide portion is closely located upwardly and downwardly of the rear engagement pin 64, the rear engagement pin 64 is supported by the fourth guide portion in the up-and-down direction, so that the displacement of the rear engagement pin 64 in the up-and-down direction may become avoidable.

Then, in the case where the drive shoe 40 is further rearwardly displaced from the state where the tilt-up operation is completed, the rear support pin 66 of the rear link member 60 is guided by the third guide portion (i.e. the supporting wall portion 26) in response to the rearward movement of the drive shoe 40 and the rear engagement pin 64 is guided by the fourth guide portion (i.e. the second groove portion 46), so that the rear end portion of the functional bracket 70 is further lifted up (i.e. the pop-up operation is completed).

Accordingly, the rear link member 60, which supports the rear portion of the functional bracket 70, is controlled so as not to be displaced in the up-and-down direction by the third guide portion (i.e. the supporting wall portion 26) of the guide rail. Furthermore, the drive shoe 40 is controlled so as not to be displaced in the up-and-down direction by the rear engagement pin 64 being engaged with the fourth guide portion (i.e. the second groove portion 46). Accordingly, the backlash of the movable panel 12 in the vertical direction while the fully-closed state may be further accurately and appropriately controlled.

Accordingly, the sun roof apparatus 10, which controls the backlash of the movable panel 12 in the vertical direction while the movable panel 12 is in the fully-closed state, may be achieved with simpler configuration.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A roof apparatus, which is configured so as to open and close a movable panel provided at an opening portion of a roof panel of a vehicle and which includes a tilt-up mode and a slide mode as opening and closing operation modes, the roof apparatus comprising:
   a guide rail fixed at the roof panel and extending in a front-rear direction of the vehicle;
   a drive shoe driven so as to move along the guide rail in the front-rear direction of the vehicle;
   a functional bracket supporting the movable panel;
   a front link member connected at a front portion of the functional bracket so as to be rotatable relative to the functional bracket and including a connecting portion rotatably connected at the front portion of the functional bracket, an engagement portion, which is located rearwardly of the connecting portion in the front-rear direction of the vehicle and is engaged with the drive shoe so as to be rotatable relative to the drive shoe, and a supporting portion, which is located forwardly of the engagement portion and is supported by the guide rail so as to be rotatable relative to the guide rail; and
   a lifting mechanism connected at a rear portion of the functional bracket and configured so as to lift the rear portion of the functional bracket in response to a movement of the drive shoe, wherein:
   the guide rail is provided with a first guide portion, which is configured so as to guide the supporting portion to be displaced in response to an opening and closing operation of the movable panel and is closely located upwardly and downwardly of the supporting portion of the front link member in a vertical direction while the movable panel is in a fully-closed state;
   the first guide portion includes an inclined portion and a front portion;
   the front portion is provided in an end of the inclined portion and includes an upper support surface and a lower support surface that each extend in a horizontal direction and face each other while keeping a distance therebetween in the vertical direction;
   the supporting portion is located in the front portion of the first guide portion while the movable panel is in the fully-closed state; and
   the drive shoe is provided with a second guide portion, which is configured so as to guide the engagement portion to be displaced in response to the opening and closing operation of the movable panel and is closely located upwardly and downwardly of the engagement portion of the front link member in the vertical direction while the movable panel is in the fully-closed state.

2. The roof apparatus according to claim 1 further comprising a weather strip at an opening edge portion of the roof panel or an edge portion of the movable panel, wherein the connecting portion of the front link member is located between a front edge portion of the movable panel and the supporting portion in the front-rear direction of the vehicle and between the front edge portion of the movable panel and the supporting portion in the vertical direction while a tilt-up operation is carried out.

3. The roof apparatus according to claim 1, wherein
   the supporting portion protrudes from a main body of the front link member in a vehicle width direction,
   the upper support surface and the lower support surface extend in the front-rear direction of the vehicle, and
   the supporting portion is located between the upper and lower support surfaces while the movable panel is in the fully-closed state.

4. The roof apparatus according to claim 1, wherein
   the engagement portion protrudes from a main body of the front link member in a vehicle width direction,
   the drive shoe includes a groove portion having a rear groove, wherein the groove portion is formed at a main body of the drive shoe and extends in the front-rear direction of the vehicle, and
   the engagement portion is located within the rear groove while the movable panel is in the fully-closed state.

5. The roof apparatus according to claim 1, wherein the front link member includes a restriction protruding portion, which protrudes from a main body of the front link member in a vehicle width direction and the guide rail includes a rear restriction surface, which is configured so as to restrict a rearward movement of the front link member in a manner that the restriction protruding portion contacts the rear restriction surface while the movable panel is in the fully-closed state.

6. The roof apparatus according to claim 1, wherein the first guide portion includes a front restriction surface, which is configured so as to restrict a movement of the front link member in a forward direction of the vehicle in a manner that the supporting portion of the front link member contacts the restriction surface while the movable panel is in the fully closed state.

* * * * *